Patented Oct. 18, 1927.

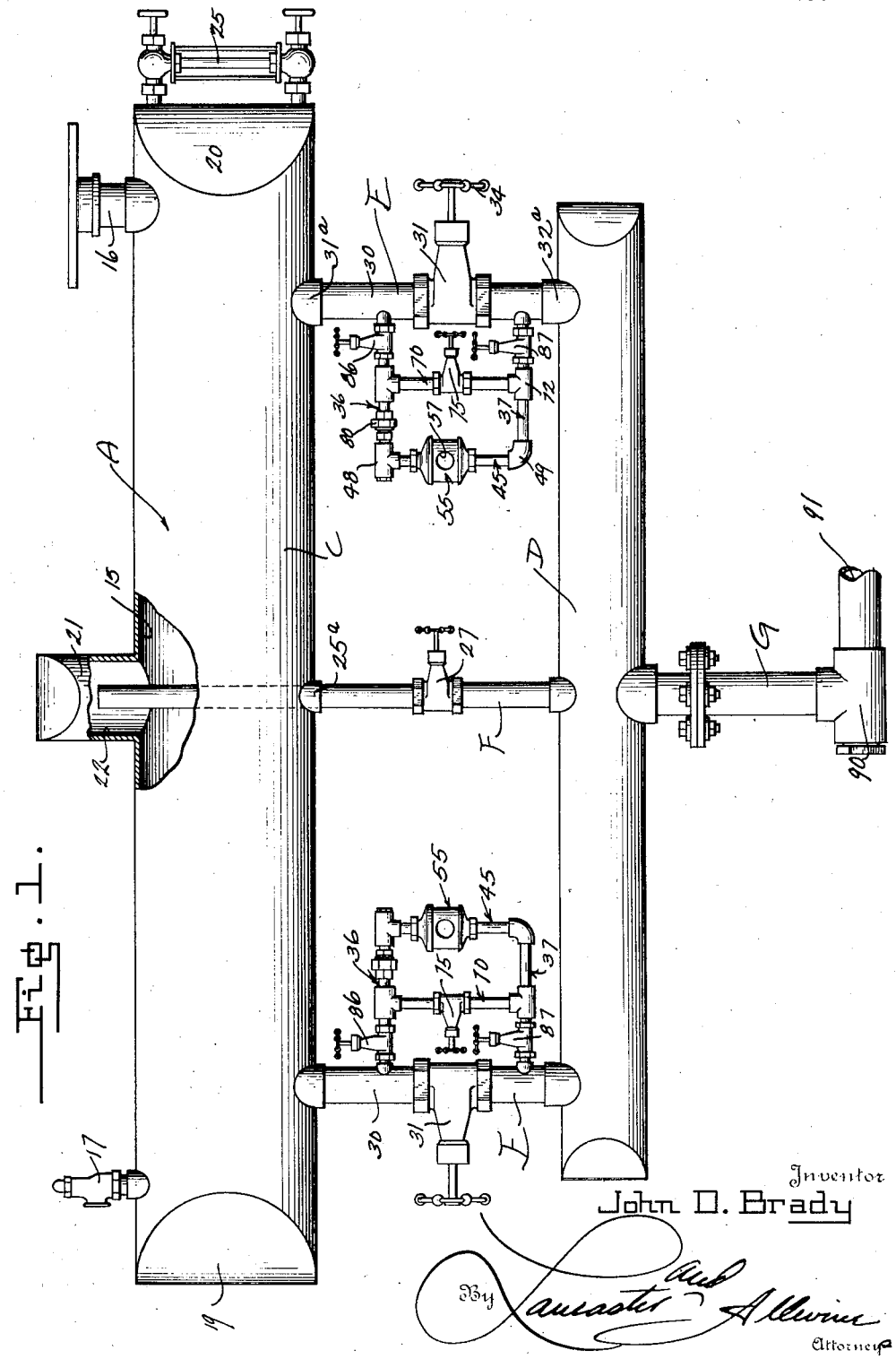

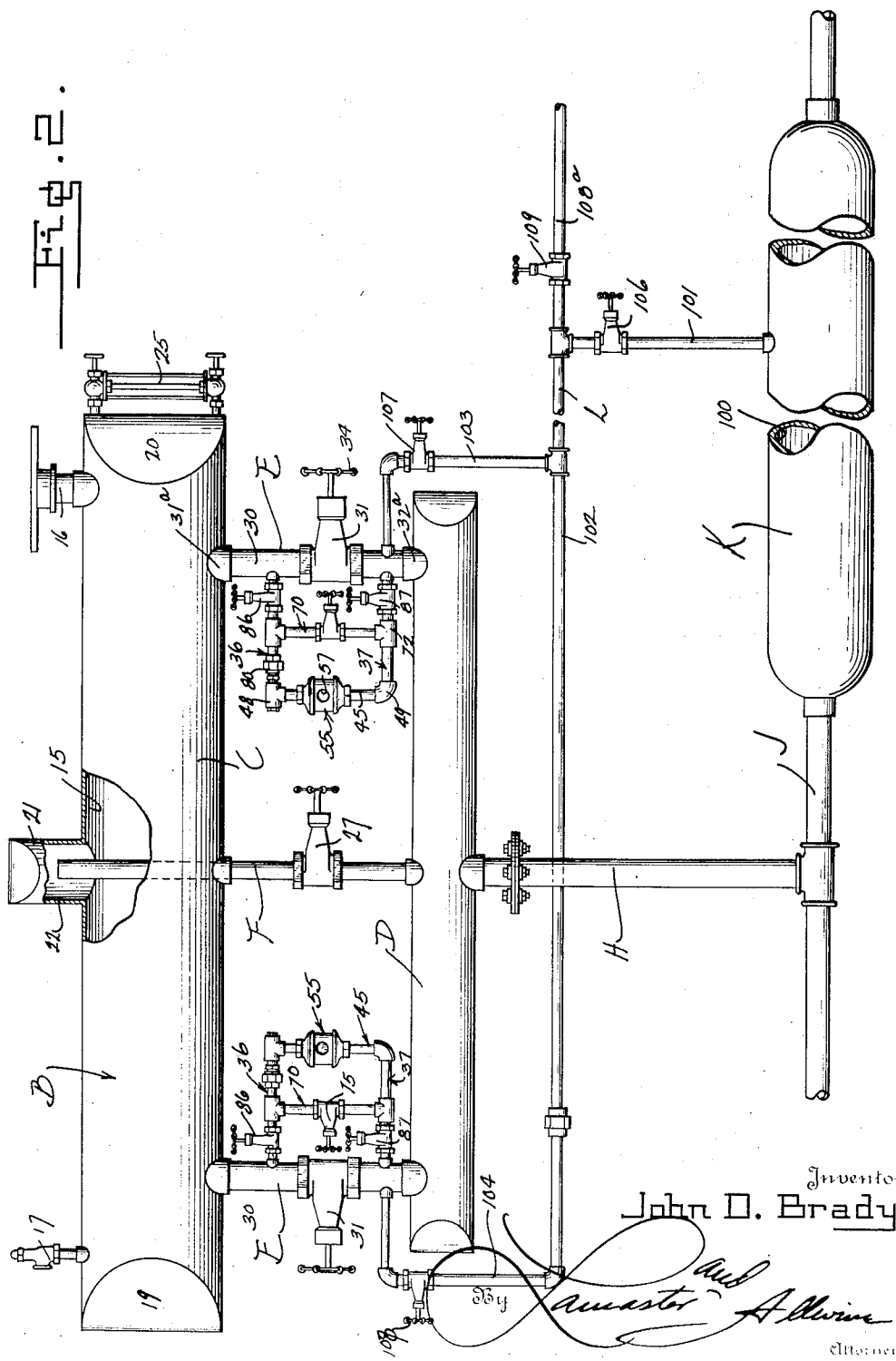

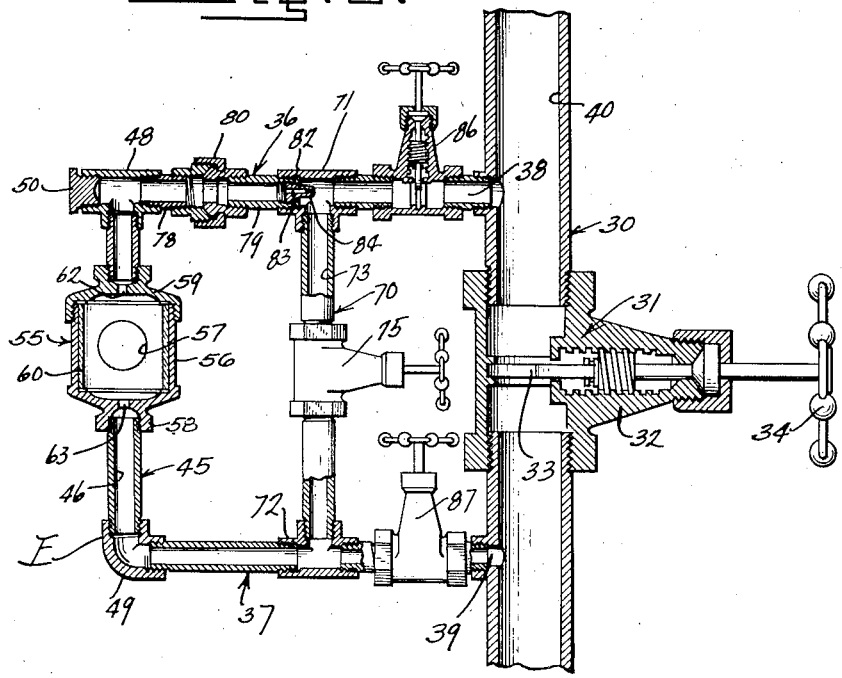
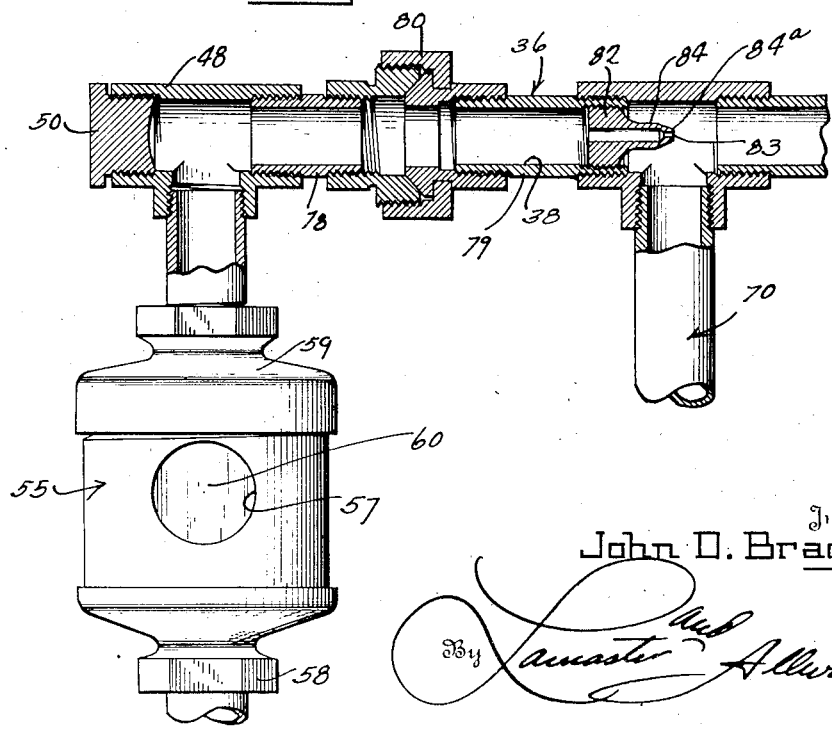

1,645,686

UNITED STATES PATENT OFFICE.

JOHN D. BRADY, OF BARTLESVILLE, OKLAHOMA, ASSIGNOR TO BRADY PROCESS COMPANY, OF EL DORADO, ARKANSAS, A CORPORATION OF DELAWARE.

FLUID-FEED APPARATUS.

Application filed July 11, 1924. Serial No. 725,529.

This invention relates to improvements in means for feeding liquids, chemicals, or reagents to various locations, in novel manner, for performing the functions for which the articles to be fed are adapted.

The primary object of this invention is the provision of apparatus which may be used for feeding of a chemical into a body of liquid, either for the purpose of preventing or breaking up hydrocarbon emulsions which may have formed in the body of liquid.

A further and important object of this invention is the provision of apparatus for the efficient feeding of a chemical or reagent into a body of hydrocarbon liquid for the purpose of breaking up hydrocarbon emulsions, dehydrating the same, or preventing the formation of hydrocarbon emulsions; the liquid being regulated by novel calibrating apparatus.

A further and important object of this invention is the provision of a fluid feed apparatus adapted for the feeding of the fluid to any desired location in a sphere where superatmospheric pressure exists and so that the fluid will feed by gravity to the desired location.

A further object of this invention is the provision of novel apparatus for the feeding of a fluid into a pressure area including novel means for reverting the pressure of the pressure area to the fluid so that the latter will enter the pressure area by gravity.

A further object of this invention is the provision of apparatus for the feeding of a chemical or reagent into an oil well, for the purpose of preventing emulsification of the oil therein, including novel means for placing the body of chemical to be fed under a pressure at least equivalent to the pressure existing in the well so that the chemical will flow by gravity into the well.

A further object of this invention is the provision of novel apparatus adapted to be used in connection with the breaking up of hydrocarbon emulsions, including means for feeding a fluid reagent into the hydrocarbon liquid, and including novel means for utilizing the pressure bearing upon the hydrocarbon liquid so that it will act upon the reagent to permit the latter to flow by gravity into the hydrocarbon liquid to be treated.

Other objects and advantages of this invention will be apparent during the course of the following detailed description.

In the accompanying drawings, forming a part of this specification, and wherein similar reference characters designate corresponding parts throughout the several views.

Figure 1 is a side elevation, partly in cross section, showing the novel apparatus which is used for feeding a liquid into oil wells wherein pressure exists.

Fig. 2 is a fragmentary side elevation, partly in cross section, showing certain of the apparatus illustrated in Figure 1, with additions thereto whereby the apparatus is best adapted for the feeding of a fluid, such as a chemical, to a body of liquid under pressure and which pressure is utilized for balancing the pressure against which the chemical must feed to the desired location.

Fig. 3 is a cross sectional view taken through a novel conduit, regulating, and sight feed apparatus used to control the flow of fluid to the desired location.

Fig. 4 is an enlarged view, partly in cross section, showing novel features of the apparatus illustrated in Figure 3.

In the drawings, wherein for the purpose of illustration are shown the preferred embodiments which the invention may assume, the letter A may generally designate the apparatus which is used for feeding of the fluid or chemical into a hydrocarbon well, and B may designate the form of apparatus which is used for feeding of a fluid or chemical into a stock tank or the like for the purpose of treating substance contained therein. The apparatuses A and B may both include the main reservoir C from which the fluid or liquid is adapted to feed into a collecting reservoir D, as through the independently controlled devices E; two of which are provided for each of the apparatuses A and B. The devices E are in reality arrangements of conduits, regulators and sight feed means. Both forms of invention A and B furthermore include conduits F connecting the reservoirs C and D, so that pressure may be transmitted from the reservoir D into the upper portion of the reservoir C to act on the fluid or liquid contained in the latter. The conduit G leads off downwardly from the collecting reservoir D for the purpose of leading the fluid or chemical into the oil well to be treated. In the form of apparatus B which is used for feeding the fluid or chemical directly to a stock tank, a conduit H may lead from the larger tank D, therebelow, and connect with the main line J, wherein liquid, such as emulsified hydrocarbon, flows to a stock tank. In the line J an expander or separator K may be placed, for the purpose of more readily obtaining a gas separation from the liquid body, for the transmitting of the gas pressure through a system of conduits L into the collector reservoir D and the structures E, as will be subsequently more specifically mentioned.

The tank C for each of the forms of invention A and B is elongated, of any approved length, preferably mounted upon a horizontal axis, and providing a compartment 15 therein adapted to receive a body of liquid or the like. In the top of this tank C, a cap 16 is preferably provided at one end as a means of filling the compartment 15, and a relief valve 17 of any approved type is preferably provided at the top in the other end of the tank C. On the top of the tank C, between the end walls 19 and 20 thereof it is preferred to provide a substantially cylindrical shaped dome 21, which provides a compartment 22 therein communicating with the compartment 15. At one end wall 20 it is preferred to provide a liquid level gage 25 of any approved type.

The collector reservoir D, may be shorter, and is preferably smaller in diameter than the tank C, and is mounted in parallel relation therebelow, being connected with the compartment 15 of the main reservoir C through the conduit arrangements E, which connect in the bottom of the main reservoir C at each end of said reservoir C and in the top of the collector reservoir D at each end of the latter, and the specific structure of which conduit, regulating, and sight feed apparatus E will be subsequently described. It is to be particularly noted that the collector reservoir D has a superatmospheric pressure existing therein, which either results from the pressure in an oil well to which the liquid of the reservoir C is to be fed, or which pressure is created by pump apparatus, or the like.

The conduit arrangement is primarily adapted for conveying the pressure existing within the collector reservoir D to the compartment 15 of the reservoir C so that said pressure will act upon the liquid in the reservoir C above the level thereof. To this end the conduit arrangement F extends from the top of the collector reservoir D between the ends of the same upwardly, preferably vertically, through the bottom wall of the main reservoir C, as through a connection 25ª, and this conduit F continues upwardly through the compartment 15 and at its upper outlet end extends into the compartment 22 of the dome 21, so that the pressure from the compartment D will outlet through the conduit F at a point in the dome compartment 22 above the maximum level of liquid which will take place at any time within the main reservoir D. It is preferred to provide a shut off valve 27, which may be of the gate type, in the conduit F, as a means of closing off pressure between the reservoirs C and D.

Referring specifically to the structure of the conduit, regulating, and sight feed devices E, it is to be noted that two of the same are provided for each of the fluid feed devices A and B, at each end of the tank C and D, connecting said tanks, and these devices E operate together or independently for the flow of the liquid from the main reservoir compartment 15 into the compartment of the collector reservoir D. As the devices E are all of the same structure, but one of the same will be described. It includes the main conduit 30, which is preferably vertically disposed, connected as at 31ª and 32ª to the bottom and top respectively of the reservoirs C and D, and between the ends thereof having the gate valve structure 31 connected therein, and which gate valve structure 31 includes the casing 32, valve head 33, and regulating handle 34, and other incidental structure. Above and below the gate valve 31 lateral horizontally extending conduits 36 and 37 are provided, which include passageways 38 and 39 respectively in communication with the passageway 40 of the main conduit 30. At the outer ends of the lateral conduits 36 and 37, a connecting conduit 45 is provided, the passageway 46 of which connects between the passageways 38 and 39 of the lateral conduits 36 and 37 respectively. The connecting conduit 45 is preferably vertically disposed, and is respectively connected with the lateral conduits 36 and 37 by detachable couplings 48 and 49, the former of which has a detachable plug 50 in the end thereof which may be removed for having access to the passageway through the uppermost lateral conduit 36. In the conduit 45, it is preferred to provide a conventional type of sight feed oil gage 55, including a body 56 having sight openings 57 therein, and the lower end of which body is provided with a coupling 58 for connection to the lower portion of the conduit 45. The upper portion of the sight feed includes a detachable cap 59 for connection to the upper part of the connecting conduit 45. A transparent closure 60 is internally provided in the sight feed casing 56 for preventing leakage of liquid through the sight openings 57. Drip openings 62 and 63 are provided in the sight feed casing structure, above and below the sight feed openings 57, which are of less cross section than the passageway 46 of the conduit in which the sight feed structure 55 is placed, in order that the drip of liquid past the sight openings 57 may be more readily discernible. A conduit 70 preferably connects the lateral conduits 36 and 37, by means of T-fittings 71 and 72 respectively, to place the passageway 73 of said conduit 70 in communication with the passageways of the laterally extending conduits 36 and 37. The conduit 70 connects with these lateral conduits 36 and 37 between the main conduit 30 and the sight feed conduit 45, and in the same is preferably disposed a cut off gate valve 75 of any approved character. It is thus to be noted that the conduit 70 is vertically disposed, and the portion of the passageway 73 above the shut off valve 75 is utilized as a trap for the collection of solid particles or sediment, to prevent the same from passing through the sight feed device 55, as will subsequently be described.

Referring now to the means for regulating the flow of the liquid chemical through the conduit passageway 38, it is preferred to make that portion of the conduit 36 between the vertical conduits 45 and 70 of special construction, namely, consisting of a pair of pipe portions 78 and 79 externally threaded on each end thereof, and connected by a detachable union 80. At its outer end the pipe portion 78 connects with the fitting 48 above described, and the pipe portion 79 connects with the T connection 71. The pipe portion 79 at its end connecting with the T fitting 71 is internally screw threaded, for detachably receiving therein a calibrating member or plug 82, which provides a constricted passageway 83 therethrough, preferably circular in cross section, and of considerably less diameter than the passageway 38 of the conduit 36. The forward end 84 of the calibrating plug 82 is preferably tapered and sharpened at its outer edge 84ª, so that this projecting portion 84 extends into the passageway 38 free of contact of the sides thereof, and the forward end of the same is disposed over the passageway 73 of the vertical conduit 70. It is at once apparent that the calibrating plug 82 is provided in order that a well regulated and limited flow of the liquid chemical may take place through the conduit 36 on its way to the sight feed 55. The opening 83 provided therethrough is just sufficient to permit this limited flow of the liquid chemical, and the reason for providing a calibrating plug in lieu of providing an ordinary valve is because of the fact that with an ordinary valve the opening would have to be so narrow and elongated, as when using a gate valve, that the finer particles of matter in the chemical, and possibly due to scale dropping thereon, the same would become readily clogged. However, providing the opening 83, which may be called a concentrated opening, that is, not elongated in character, gives a sufficient area to permit the same to remain open, notwithstanding the presence of finer particles in the liquid to be regulated.

In the lateral conduits 36 and 37, between the main conduit 30 and its adjacent vertical conduit 70 it is preferred to provide shut off valves 86 and 87, respectively, for a purpose which will be subsequently described.

Referring now to the apparatus A, which is primarily used for the feeding of a fluid into a pressure area, a discharge conduit G leads from the bottom of the collector reservoir D, between the ends of the latter, and may be connected by an angle fitting 90 with a line 91 which leads to any suitable location, such as to a well, in case the improved apparatus A is used for feeding of a liquid or chemical into the well for treatment of the petroleum therein.

Referring to the operation of the apparatus A when it is used for feeding an emulsion preventing chemical to the well, it is to be noted that conditions must so exist in the apparatus A that the chemical will be able to flow against the superatmospheric pressure of the gas existing in the well. In order to fill the reservoir C, the valves 31 in both of the apparatuses E are closed, as are also the valves 86 in the top lateral conduits 36. The valve 27 in the pressure balancing line is also closed, and the gas pressure from the well is then cut off from the main reservoir compartment 15, and the chemical or liquid may be fed into the main reservoir through the cap opening, until the compartment 15 has been filled to the desired level, below the dome compartment 22. During operation the upper and lower valves 86 and 87 of the lateral conduits 36 and 37 respectively remain open, whereas the valves 31 and 75 of the main and trap conduits 30 and 70 respectively are kept closed. The gas pressure from the well is then enabled to travel counter to the flow of the liquid chemical, into the tank compartment 15, and if no means were provided to maintain a balanced pressure above and below the head of liquid chemical it would not flow into the line 91 on its way to the well. Therefore, when the valve 27 is opened the gas pressure existing in the collector reservoir C passes through the line F into the dome compartment 22 and acts on the top of the liquid chemical in the reservoir C. The chemical is then located in a sphere of superatmospheric pressure, and the same may flow by gravity downwardly through the main conduit passageway 40 of each of the devices E at each end of the main reservoir C, and the chemical is of course prevented from passing the valve 31 as the latter is closed. The liquid then flows into the passageway 38 of the upper conduit 36, past the valve 86, and against the sharp projecting portion 84 of the calibrating plug 82. Should any solid particles exist in the chemical, as is sometimes the case, the same will settle into the passageway 73 of the connecting conduit 70, above the valve 75, and because of the relatively small but concentrated opening 83 a continuous thin stream of the liquid will flow past the calibrating plug 82 and continuously drop through the sight feed apparatus 55 to the lower cross conduit 37, and again enters the passageway 40 of the main conduit 30, at a point below the shut off valve 31. From here the liquid chemical passes from both the main conduits 30 at the ends of the collector reservoir D into said reservoir's compartment and therein flows into the discharge line G and then through the line 91 into the well apparatus (not shown), so that the liquid chemical may combine with the petroleum in the well, at the bottom thereof, for the prevention of the formation of hydrocarbon emulsions, in the manner substantially as set forth in my co-pending application Serial Number 700,667, filed March 20th, 1924. As above mentioned super-atmospheric pressure exists throughout the apparatus, and the liquid may flow by gravity into the well, due to the balanced pressure acting thereon. The sharp edges 84ª of the calibrating plugs 82 will tend to cut any particles which may lodge against the inlet end of the plug or member 82, and any foreign particles collecting about the projection 84 will drop into the passageway 73, above the valve 75, where they are trapped therein. It is to be noted that the parts of the control, sight feed, and conduit structure E are readily detachable from each other to enable the cleansing of the passageways and details thereof. Merely by opening the valve 75 the sediment may be drained from the trap in the passageway 73 and permitted to pass on its way to the well. If it is desired at any time to feed a large quantity of the liquid or chemical from the reservoir into the well the same may be effected merely by regulating the position of the valve 31. If it becomes necessary at any time to cleanse the sight feed structure, or any of the structure in the vertical conduit 70, the same may be effected merely by the closing of the valves 31 and 86, and the parts of this defective structure E may be readily disassembled, notwithstanding the fact that the other control or regulating structure E is properly functioning in the apparatus A for the passage of the liquid therethrough.

Referring to the specific structure of the apparatus B, not heretofore described, the expander K in the line J is preferably of the elongated cylinder type, having a compartment 100 therein of much greater diameter than the compartment in the pipe J, so that the oil and gas passing through the conduit J as it enters the expander or separator K is enabled to separate the more effectively so that pressure of the gas may be the more readily transmitted to the main reservoir C for pressure balance of the liquid therein. To this end, a vertical conduit 101, or the like is connected in the top of the separator K, and at its upper end connects in a horizontal line 102; the horizontal line 102 having respective connections 103 and 104 with the main conduits 30 of the two structures E of the apparatus B, at points above collector tank D. In the line 101 a valve 106 is preferably disposed, as are also valves 107 and 108 disposed in the respective main conduit connecting lines 103 and 104. The operation of the apparatus B is the same as above described for the form of invention A, with certain minor distinctions. The apparatus B is preferably used for the treatment of emulsified hydrocarbon products in a storage tank, or on their way to a storage tank, as they flow through the line J. The liquid chemical to treat the hydrocarbon emulsions is fed into the collector reservoir D through the devices E, as above described, and the balanced pressure on top of the liquid in the reservoir C is maintained by reason of the gas pressure which passes through the line 101 and the lines 102, 103 and 104 into the main conduits 30, and thence into the collector reservoir D and upwardly through the line F into the dome compartment 22. The liquid chemical drips through the drain line H into the stock flowing through the line J away from the expander K. It is preferred that the liquid chemical flow by gravity, and if the gas pressure from the expander or separator K is not sufficient to balance the pressure or to permit a good feed of the liquid chemical through the apparatus B, pressure may be fed through a line 108ª from any suitable source, such as a gas main, and which line 108ª connects directly with the line 102, having a valve 109 therein which is normally closed when the gas pressure is solely obtained from the expander or separator K.

From the foregoing description of this invention it is apparent that the improved apparatus described is susceptible of two very important uses in connection with the prevention and the treatment of hydrocarbon emulsions. It is to be distinctly understood, however, that the device may be used for feeding various fluids to desired locations under different circumstances, and especially where it is desired to have a feed of a fluid to a pressure area.

Various changes in the shape, size, and arrangement of parts may be made to the forms of the invention herein shown and described, without departing from the spirit of the invention or the scope of the claims.

I claim:

1. In an apparatus for feeding of a liquid into a pressure area the combination of a liquid receiving reservoir, means communicating the liquid receiving reservoir with the pressure area so that the same pressure is applied above the liquid as exists in the pressure area, conduit means for feeding the liquid in the reservoir into the pressure area, a trap in said conduit means for receiving sediment, and a tapered member in said conduit means through which the liquid flows on its way from the reservoir to the pressure area, said tapered member projecting at its tapered end over the sediment trap to diverge sediment flowing through the conduit means into said trap.

2. In a fluid feed device of the class described the combination of a vertically disposed main conduit, horizontal conduits laterally extending from the main conduit in communicating relation therewith, a valve for the main conduit between said laterally extending conduits, a vertical connecting conduit between said lateral conduits having a sight feed device therein, a second vertical conduit connecting the lateral conduits between the main conduit and the conduit in which said sight feed is disposed, a valve in said last mentioned vertical conduit between the ends thereof, and valve means in said horizontal conduits.

3. In apparatus of the class described a main reservoir, a collector reservoir, means connecting the collector reservoir and main reservoir for equalizing pressure therein, a main conduit connected between said main and collector reservoirs, a valve in said conduit, lateral conduits connected with the main conduit above and below the valve therein, a connecting conduit between the upper and lower lateral conduits, a sight feed in said connecting conduit, and valve means in said lateral conduits.

4. In apparatus of the class described a main reservoir, a collector reservoir, means connecting the collector reservoir and main reservoir for equalizing pressure therein, a main conduit connected between said main and collector reservoirs, a valve in said conduit, lateral conduits connected with the main conduit above and below the valve therein, a connecting conduit between the upper and lower lateral conduits, a sight feed in said connecting conduit, valve means in said lateral conduits, and a calibrating member in said upper lateral conduit.

5. In a fluid feed device of the class described a main conduit, a valve in the main conduit, lateral conduits connected with the main conduit above and below the valve therein, a cross conduit connecting the upper and lower conduits, a sight feed device in said cross conduit, a trap conduit connecting the upper and lower conduits between the cross conduit and the main conduit and having a valve therein, and a calibrating member in the upper conduit providing a concentrated opening therethrough, said calibrating member projecting in reduced relation in the passageway of the upper lateral conduit over the passageway of the trap conduit whereby any sediment disposed in the liquid flowing against said calibrating member will drop by gravity into the trap conduit against the valve therein.

6. In a fluid feed device of the class described a main conduit, a valve in the main conduit, lateral conduits connected with the main conduit above and below the valve therein, a cross conduit connecting the upper and lower conduits, a sight feed device in said cross conduit, a trap conduit connecting the upper and lower conduits between the cross conduit and the main conduit and having a valve therein, a calibrating member in the upper conduit providing a concentrated opening therethrough, said calibrating member projecting in reduced relation in the passageway of the upper lateral conduit over the passageway of the trap conduit whereby any sediment disposed in the liquid flowing against said calibrating member will drop by gravity into the trap conduit against the valve therein, and valves for the upper and lower lateral conduits between the trap conduit and the main conduit.

7. In a device for feeding a hydrocarbon emulsion preventative to a pressure area, a main reservoir adapted to receive the hydrocarbon emulsion preventative, means connecting the reservoir with the pressure area to equalize the pressure existing therein, a main conduit connecting the main reservoir with the pressure area having a valve therein, conduit means connected with the main conduit at opposite sides of the valve therein, a sight feed in said conduit means, and a calibrating member providing a concentrated opening therein, said calibrating member being disposed in said conduit means between the sight feed opening and the main reservoir.

8. In apparatus of the class described a main reservoir, a hydrocarbon flow line adapted to receive hydrocarbon therein under some pressure, a separator in said hydrocarbon flow line wherein the gas under pressure may readily separate from the oil, means connecting the flow line with the main reservoir for regulating flow of liquid from the main reservoir into the flow line, and means connecting the separator with the main reservoir for balancing pressure therein with the pressure existing in the flow line.

9. In an apparatus of the class described the combination of a reservoir adapted to receive a liquid, a main conduit connected with said reservoir for flow of liquid therefrom, a sight feed device having conducting connection with the reservoir for flow of liquid therefrom into the same, and valve means for closing the main conduit to direct entire flow into the sight feed device.

10. In apparatus for feeding of a liquid into an area under superatmospheric pressure, the combination of a main liquid containing tank, a collecting tank, means to connect the collecting tank with an exterior area under superatmospheric pressure, means connecting the last mentioned tank with the main tank so that the superatmospheric pressure which exists in the collecting tank may pass into the main tank above the head of liquid therein, and means for feeding the liquid from the main tank by gravity into the collecting tank and then exteriorly therefrom into the area which is under superatmospheric pressure.

JOHN D. BRADY.